(12) United States Patent
Kim et al.

(10) Patent No.: US 8,032,177 B2
(45) Date of Patent: Oct. 4, 2011

(54) MOBILE COMMUNICATION DEVICE WITH ENHANCED IMAGE COMMUNICATION CAPABILITY

(75) Inventors: Eun-Mi Kim, Seoul (KR); Yoo-Seok Cho, Gyeonggi-Do (KR); Dong-Eun Kim, Seoul (KR); Jung-Pil Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 1154 days.

(21) Appl. No.: 11/558,397

(22) Filed: Nov. 9, 2006

(65) Prior Publication Data

US 2007/0070184 A1    Mar. 29, 2007

Related U.S. Application Data

(63) Continuation of application No. 11/023,084, filed on Dec. 27, 2004, now Pat. No. 7,499,074.

(30) Foreign Application Priority Data

Dec. 26, 2003  (KR) .......................... 10-2003-0097901

(51) Int. Cl.
*H04M 1/00* (2006.01)
(52) U.S. Cl. ........ 455/556.1; 345/1.1; 345/1.3; 345/2.2; 348/14.07; 361/680
(58) Field of Classification Search ............. 348/333.71, 348/14.07; 345/1.1, 1.3, 2.2; 361/680
See application file for complete search history.

(56) References Cited

U.S. PATENT DOCUMENTS

| | | | |
|---|---|---|---|
| 6,177,926 B1 | 1/2001 | Kunert | |
| 6,341,902 B1* | 1/2002 | Sato et al. | 396/529 |
| 6,510,325 B1 | 1/2003 | Mack et al. | |
| 6,791,597 B2 | 9/2004 | Ando et al. | |
| 7,046,287 B2* | 5/2006 | Nishino et al. | 348/333.06 |
| 2001/0008412 A1 | 7/2001 | Ando et al. | |
| 2001/0011029 A1 | 8/2001 | Iwabuchi et al. | |
| 2002/0006804 A1 | 1/2002 | Mukai et al. | |
| 2002/0118824 A1 | 8/2002 | Yun | 379/428.1 |
| 2002/0142810 A1 | 10/2002 | Kawasaki et al. | |

(Continued)

FOREIGN PATENT DOCUMENTS

EP          0 898 405 A2     2/1999

(Continued)

OTHER PUBLICATIONS

Anonymous: "Fujitsu F2102V" 3GNEWSROOM, [Online] XP002458014 Retrieved from the Inernet: URL:http://www.3gnewsroom. com/3g_mobile_ph one_review/devices.php?mode1=F2102V> [retrieved on Nov. 9, 2009]*the whole document*.

*Primary Examiner* — Kamran Afshar
*Assistant Examiner* — Edward Zhang
(74) *Attorney, Agent, or Firm* — Lee, Hong, Degerman, Kang & Waimey

(57) ABSTRACT

The present invention discloses a mobile communication device that allows the user to easily perform simultaneous voice communication and image communication that allows the user to transmit high quality image information to another user and receive high quality image information from another user. The mobile communication device provides multiple cameras and/or display screens that allow a user to easily photograph a subject and view captured images that are received either from a camera located in the device or from another user.

25 Claims, 9 Drawing Sheets

U.S. PATENT DOCUMENTS

| | | |
|---|---|---|
| 2002/0159774 A1 | 10/2002 | Koyama et al. |
| 2003/0036365 A1* | 2/2003 | Kuroda .......................... 455/90 |
| 2003/0048363 A1 | 3/2003 | Watanabe |
| 2003/0112358 A1 | 6/2003 | Hamada |
| 2003/0117501 A1 | 6/2003 | Shirakawa |
| 2003/0144036 A1 | 7/2003 | Ito |
| 2003/0155216 A1 | 8/2003 | Park et al. |
| 2003/0211872 A1 | 11/2003 | Meins et al. |
| 2003/0224773 A1* | 12/2003 | Deeds ........................... 455/419 |
| 2004/0014488 A1* | 1/2004 | Sawayama et al. ........ 455/550.1 |
| 2004/0103313 A1* | 5/2004 | Kreiner et al. ............... 713/201 |
| 2004/0130658 A1 | 7/2004 | Yamaguchi et al. |
| 2005/0046633 A1* | 3/2005 | Aleksic et al. ............... 345/522 |
| 2005/0046740 A1* | 3/2005 | Davis ........................... 348/373 |
| 2005/0104955 A1* | 5/2005 | Navntoft .................... 348/14.02 |
| 2006/0250419 A1 | 11/2006 | Shiba et al. |

FOREIGN PATENT DOCUMENTS

| | | |
|---|---|---|
| EP | 1 081 943 A1 | 3/2001 |
| EP | 1 126 709 A1 | 8/2001 |
| EP | 1173009 A1 | 1/2002 |
| EP | 1 271 904 A2 | 1/2003 |
| EP | 1 298 925 A2 | 4/2003 |
| EP | 1318650 A2 | 6/2003 |
| EP | 1 298 925 A3 | 4/2004 |
| EP | 1841225 | 10/2007 |
| GB | 2 384 384 A | 7/2003 |
| GB | 2394381 * | 4/2004 |
| JP | 50028161 U | 4/1975 |
| JP | 405020591 A | 1/1993 |
| JP | 408265449 A | 10/1996 |
| JP | 09-325850 | 12/1997 |
| JP | 11088483 | 3/1999 |
| JP | 11298869 | 10/1999 |
| JP | 2001-045124 | 2/2001 |
| JP | 2001-169166 | 6/2001 |
| JP | 2002189533 | 7/2002 |
| JP | 2002-300257 A | 10/2002 |
| JP | 2002-344962 | 11/2002 |
| JP | 200-3018257 | 1/2003 |
| JP | 2003-032344 | 1/2003 |
| JP | 2003-162687 | 6/2003 |
| JP | 2003162355 | 6/2003 |
| JP | 2003-196016 | 7/2003 |
| JP | 2003-224632 | 8/2003 |
| JP | 2003274376 | 9/2003 |
| JP | 2003-289349 | 10/2003 |
| JP | 2003283618 | 10/2003 |
| JP | 2003298884 | 10/2003 |
| JP | 2003-333155 A | 11/2003 |
| JP | 2005191899 | 7/2005 |
| KR | 010048086 | 6/2001 |
| KR | 1020020061249 A | 7/2002 |
| KR | 1020030001255 A | 1/2003 |
| KR | 1020030038390 A | 5/2003 |
| KR | 1020030041614 A | 5/2003 |
| KR | 1020030042682 A | 6/2003 |
| KR | 1020030083318 A | 10/2003 |
| KR | 1020050010556 A | 1/2005 |
| WO | WO 02-33940 A2 | 4/2002 |
| WO | WO 03/077553 A1 | 9/2003 |

* cited by examiner

MOBILE COMMUNICATION DEVICE WITH ENHANCED IMAGE COMMUNICATION CAPABILITY

CROSS-REFERENCE TO RELATED APPLICATIONS

This application is a continuation of U.S. application Ser. No. 11/023,084, filed Dec. 27, 2004, now U.S. Pat. No. 7,499, 074, which pursuant to 35 U.S.C. §119(a), claims the benefit of earlier filing date and right of priority to Korean Application No. 10-2003-0097901, filed on Dec. 26, 2003, the contents of which are hereby incorporated by reference herein in their entirety.

BACKGROUND OF THE INVENTION

1. Field of the Invention

The present invention relates to a mobile communication device that allows the user to perform image communication, and more particularly to a mobile terminal that allows the user to easily transmit high quality image information to another user and receive high quality image information from another user during image communication by performing simple operations.

2. Description of the Related Art

Mobile terminals have generally been used for wireless voice communication. As mobile terminals have become more advanced, functions such as receiving images and multimedia transmissions over the Internet have been incorporated in addition to voice communication functions. Camera phones having various shapes of cameras for photographing a subject and storing the captured image as an image file are now widely used.

In addition, a rotary-type camera that may be rotated at a predetermined angle may be mounted on a mobile terminal, thereby enabling a user to conveniently photograph a subject. The mobile terminal supports image communication using the rotary-type camera.

FIG. 1 illustrates a conventional mobile terminal 1. The mobile terminal 1 includes a main body 20, a circuit unit (not shown) installed inside the main body 20 for controlling communication, a battery 22 detachably mounted on the rear side of the main body, a folder 30 hinge-coupled to the main body via a hinge device 40, an auxiliary display panel 31 and a main display panel (not shown) installed at the front and rear portions, respectively, of the folder and a camera unit 10 installed on the hinge device 40.

As illustrated in FIG. 2, the camera unit 10 is a rotary type camera that may be rotated to photograph a subject according to various positions of the subject. The camera unit 10 includes a rotary cylinder 13 rotatably installed on the hinge device 40, a bracket 14 fixed to the main body 20 for supporting the rotary cylinder 13, a camera lens 11a installed on the rotary cylinder, and an FPCB 12 for transmitting signals by connecting the camera lens to the circuit unit.

In order to photograph a subject, the user adjusts the camera lens 11a to face the subject by rotating the rotary cylinder 13 in the circumferential direction 16 according to an image displayed on the main display panel and operates the camera via a photographing button when the subject is displayed on the main display panel in the desired position. However, when the user intends to transmit his/her image and a peripheral image to another user during image communication, the user must control the camera lens 11a to face himself/herself by rotating the rotary cylinder 13.

A camera having a large number of pixels to produce a high quality photographic image may be desired. On the other hand, a camera having a small number of pixels may be desired to produce a lower quality image with a reduced size in order to facilitate transmission of the photographic image during image communication.

However, the conventional mobile terminal includes only a single camera. Therefore, if a camera having a large number of pixels is provided, image data transmission is compromised while a high quality photographic image is not attainable if a camera having a small number of pixels is provided.

Therefore, there is a need for a mobile communication device that facilitates image data transmission while allowing a high quality photographic image to be captured in a manner that allows a user to easily view the subject that is photographed. The present invention addresses these and other needs.

SUMMARY OF THE INVENTION

The present invention is directed to a to a to a mobile communication device which allows the user to easily perform simultaneous voice communication and image communication that allows the user to transmit high quality image information to another user and receive high quality image information from another user.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication device that provides multiple cameras and/or display screens that allow a user to easily photograph a subject and view captured images that are received either from a camera located in the device or from another user. Specifically, the cameras and/or display screens are located on the mobile communication device such that viewing of the display screens is enhanced while a user uses a camera to photograph a subject. Although the invention is described herein with regard to a mobile terminal, it is contemplated that the invention may be utilized for any mobile communication device that provides voice and imager communication.

In one aspect of the present invention, a mobile communication device is provided. The mobile communication device includes a main body, a folder rotatably installed on the main body such that the folder has an open configuration and a closed configuration, at least one camera and one or more display units located on the folder and one or more display units located on the main body. The display units located on the folder and the display units located on the main body are activated and may be viewed by a user simultaneously without the user having to rotate the device back and forth.

In a first embodiment, a display unit located on the main body has a screen inclined toward the user. Preferably, the inclination angle between the screen and the main body is substantially identical to an inclination angle between the folder and the main body when the folder is in the open configuration. It is contemplated that the inclination angle may range from about 40° to about 55°.

In a second embodiment, a display unit located on the main body has a screen formed on the same plane surface as the main body. It is contemplated that the screen may be adjustable such that it may be inclined toward the user.

It is contemplated that a display unit located on the main body may be adapted such that the screen may be viewed when the folder is in the closed configuration. Preferably, the display located on the main body includes a transparent protecting window that covers the screen of the display unit when the folder is in the closed configuration.

It is contemplated that a display unit located on the main body may include a touch pad that enables a user to enter textual information and/or graphical information. It is further contemplated that the information entered by a user on the touch pad may be displayed on the screen of the display unit located on the folder, stored in the mobile communication device and/or transmitted to another mobile communication device.

It is contemplated that a user may be able to select on which display unit images captured by the camera are displayed. It is further contemplated that a display unit located on the folder may have multiple screen regions such that a user may select the content and attributes of the screen regions. Moreover, it is contemplated that a user may be able to display images captured by the camera on one screen region while displaying other images and/or information on a second screen region.

It is contemplated that the images and/or information displayed on the second screen region may be received from another mobile communication device. It is further contemplated that the information displayed on the second screen region may be information entered on a touch pad included on the screen of the display unit located on the main body.

It is contemplated that the camera may be located on the main body either on the same side as a display unit or on the opposite side of a display unit. It is further contemplated that the camera may be located on the folder either on the same side as a display unit or on the opposite side of a display unit.

The mobile communication device may also include a flash unit located on the same portion as the camera. Furthermore, the mobile communication device may include a slide cover over the camera that may be opened and closed.

The mobile communication device may also include a second camera. It is contemplated that the mobile communication device may also include a second flash unit located on the same portion as the second camera. Moreover, it is contemplated that the first camera and second camera may include charge coupled devices (CCD) and that the number of pixels of the charge coupled device of the first camera may be significantly different than the number of pixels of the charge coupled device of the second camera.

It is contemplated that the second camera may be located on the main body either on the same side as a display unit or on the opposite side of a display unit. It is further contemplated that the second camera may be located on the folder either on the same side as a display unit or on the opposite side of a display unit. Preferably, the second camera is located on the opposite side of the main body where a display unit is located, the display unit located on the main body may be viewed when the folder is in the closed configuration and image data captured by the second camera is automatically displayed on the screen of the display unit located on the main body when the folder is in the closed configuration and the second camera is activated.

It is contemplated that a user may be able to select on which display unit images captured by the first and second cameras are displayed. If a display unit located on the folder includes multiple screen regions such that a user may select the content and attributes of the screen regions, it is further contemplated that a user may be able to display images from both the first camera and the second camera at the same time on different regions of the display.

In another aspect of the present invention, a mobile communication device is provided. The mobile communication device includes a main body, a folder rotatably installed on the main body such that the folder has an open configuration and a closed configuration, two cameras with one camera located on the folder and the other camera located on the main body, and one or more display units located on the folder and one or more display units located on the main body. A display unit located on the main body allows a user to enter information as well as view information.

The two cameras and display units are located such that when the folder is in the open configuration, a user may view a photographic image of himself or herself on a display unit of the folder as the photographic image is captured by the camera on the folder while at the same time viewing either another photographic image or information on the same display unit of the folder, the other photographic image either viewed as it is captured by the camera on the main body or received from another mobile communication device and the information either entered by the user on a display unit of the main body or received from another mobile communication device. The user may, for example, view an image of himself or herself that is being captured by the camera located on the folder and transmitted to another user while simultaneously viewing a received image of the other user or another image being captured by the camera located on the main body and transmitted to the other user or simultaneously viewing information received from another user or information being input by the user on a display unit of the main body and transmitted to another user.

Furthermore, a display unit of the main body may be viewed when the folder is in the closed configuration such that the user may view a photographic image on the display unit of the main body as the photographic image is captured by the carriers located on the main body. The user may, for example, capture and view a photographic image with the camera located on the main body without opening the folder of the mobile communication device.

In a first embodiment, a display unit located on the main body has a screen inclined toward the user. Preferably, the inclination angle between the screen and the main body is substantially identical to an inclination angle between the folder and the main body when the folder is in the open configuration. It is contemplated that the inclination angle may range from about 40° to about 55°.

In a second embodiment, a display unit located on the main body has a screen formed on the same plane surface as the main body. It is contemplated that the screen may be adjustable such that it may be inclined toward the user.

It is contemplated that a display located on the main body may include a transparent protecting window that covers the screen of a display unit when the folder is in the closed configuration. It is further contemplated that a display unit located on the main body may include a touch pad that enables a user to enter textual information and/or graphical information. Moreover, it is contemplated that the information entered by a user on the touch pad may be displayed on the screen of a display unit located on the folder, stored in the mobile communication device and/or transmitted to another mobile communication device.

It is contemplated that a user may be able to select to display the image captured by either camera on any display unit. It is further contemplated that a display unit located on the folder may have multiple screen regions such that a user may select the content and attributes of the screen regions.

It is contemplated that the camera located on the main body may be located either on the same side as a display unit or on the opposite side of a display unit. It is further contemplated that the camera located on the folder may be located either on the same side as a display unit or on the opposite side of a display unit.

The mobile communication device may also include a flash unit located on the same portion of the folder as the camera. Furthermore, the mobile communication device may also include a second flash unit located on the same portion of the main body as the camera. Moreover, the mobile communication device may include a slide cover over the camera located on the main body that may be opened and closed.

Preferably, the camera is located on the opposite side of the main body where a display unit is located and image data captured by the camera located on the main body is automatically displayed on the screen of the display unit of the main body when the folder is in the closed configuration and the camera located on the main body is activated. It is further contemplated that the each camera may include a charge coupled device (CCD) and that the number of pixels of the charge coupled device of one camera may be significantly different than the number of pixels of the charge coupled device of the other camera.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
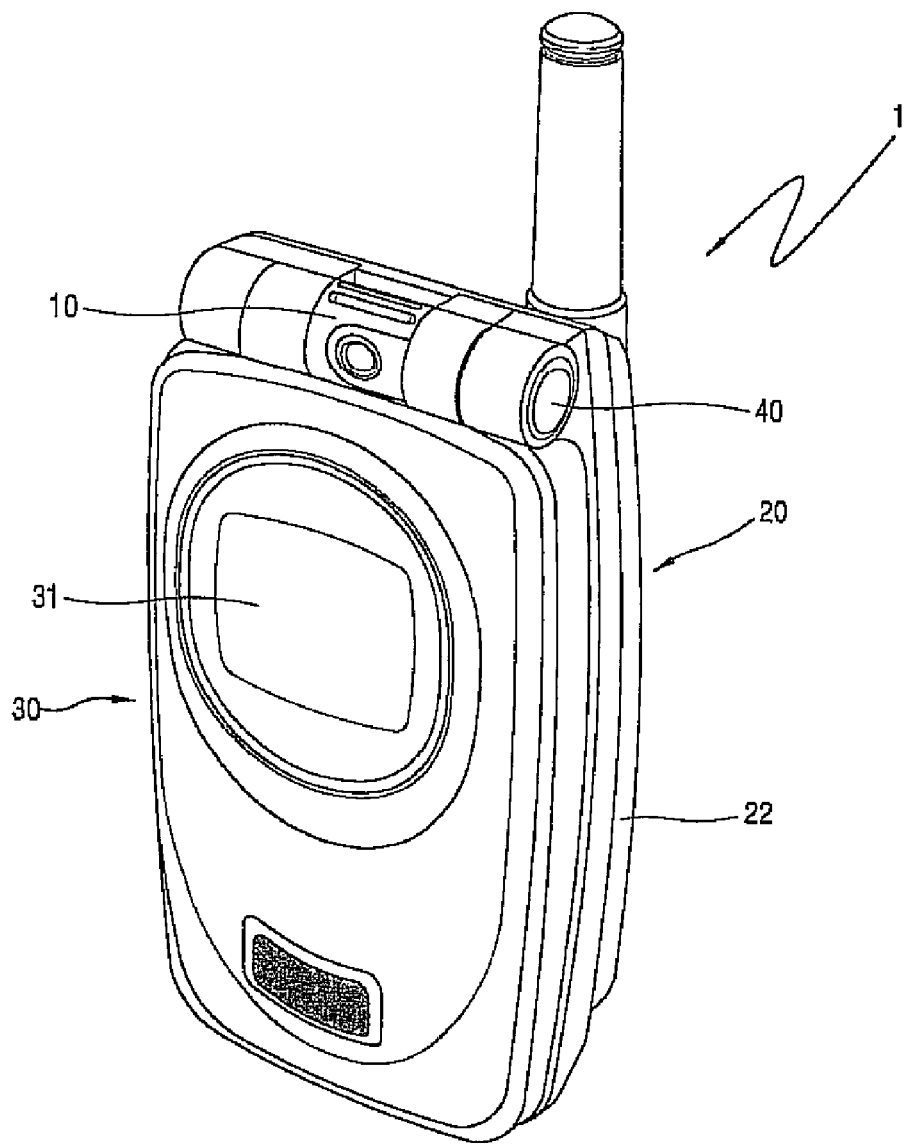
FIG. 1 is a perspective view illustrating a conventional mobile terminal.
Figure 2:
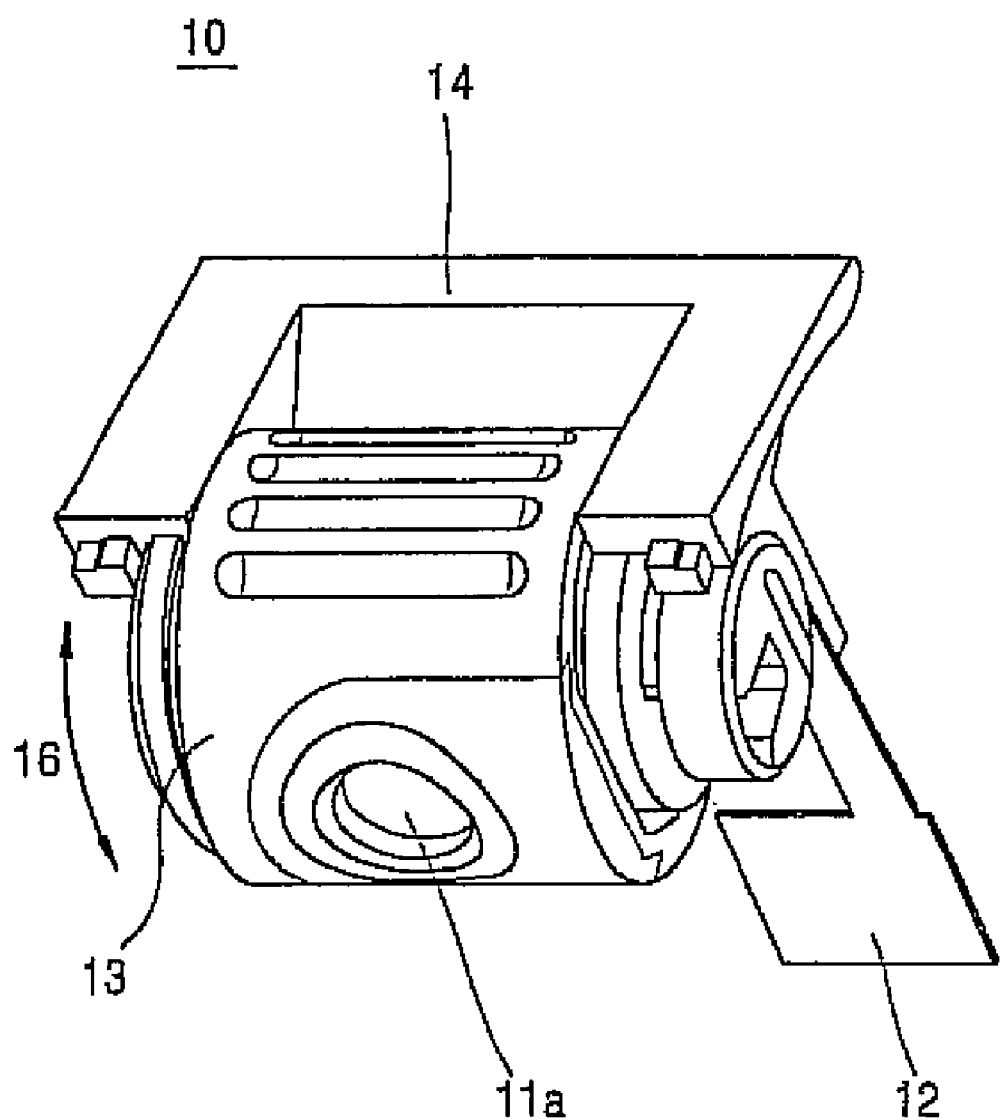
FIG. 2 is a perspective view illustrating a camera of the mobile terminal of FIG. 1.
Figure 3:
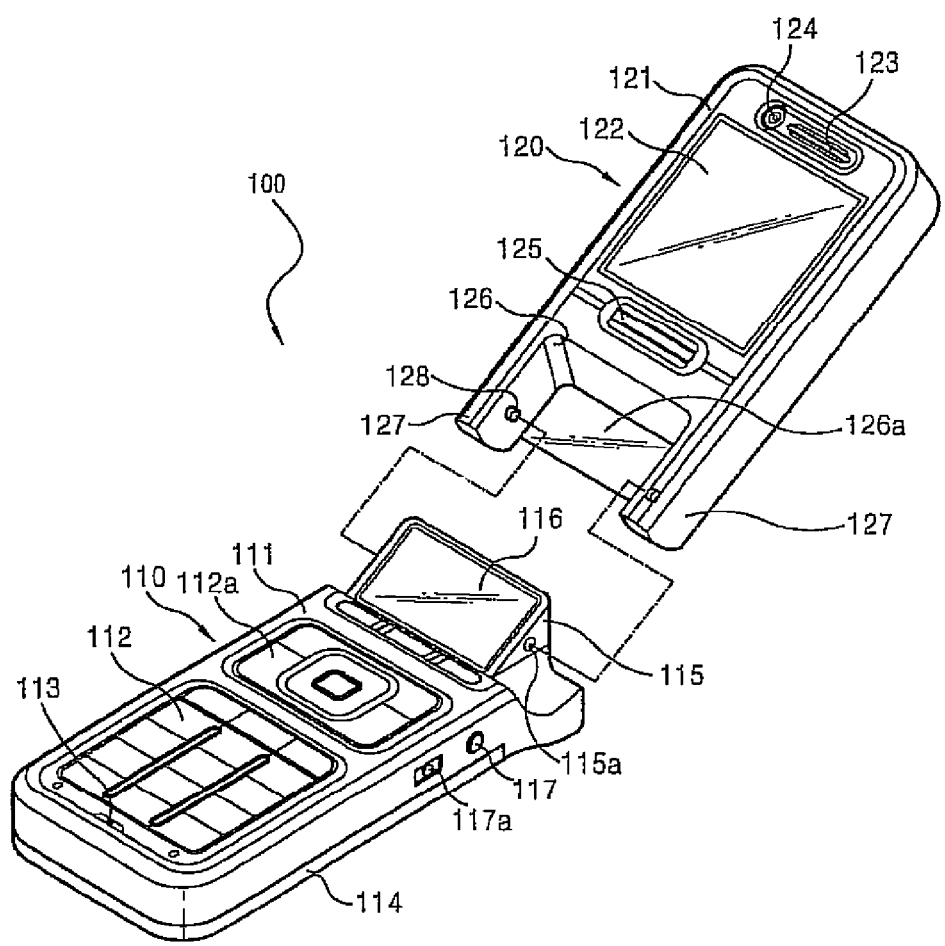
FIG. 3 is a disassembled perspective view illustrating a mobile terminal according to one embodiment of the present invention.
Figure 4:
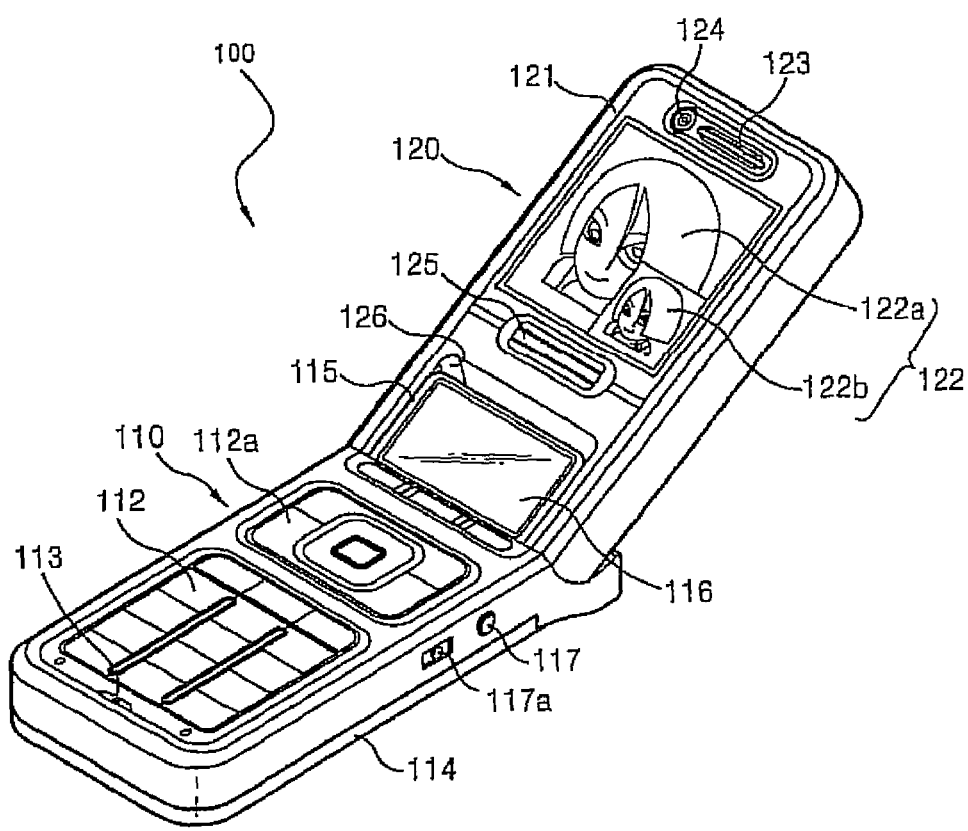
FIG. 4 is a perspective view illustrating the mobile terminal of FIG. 3.
Figure 5:
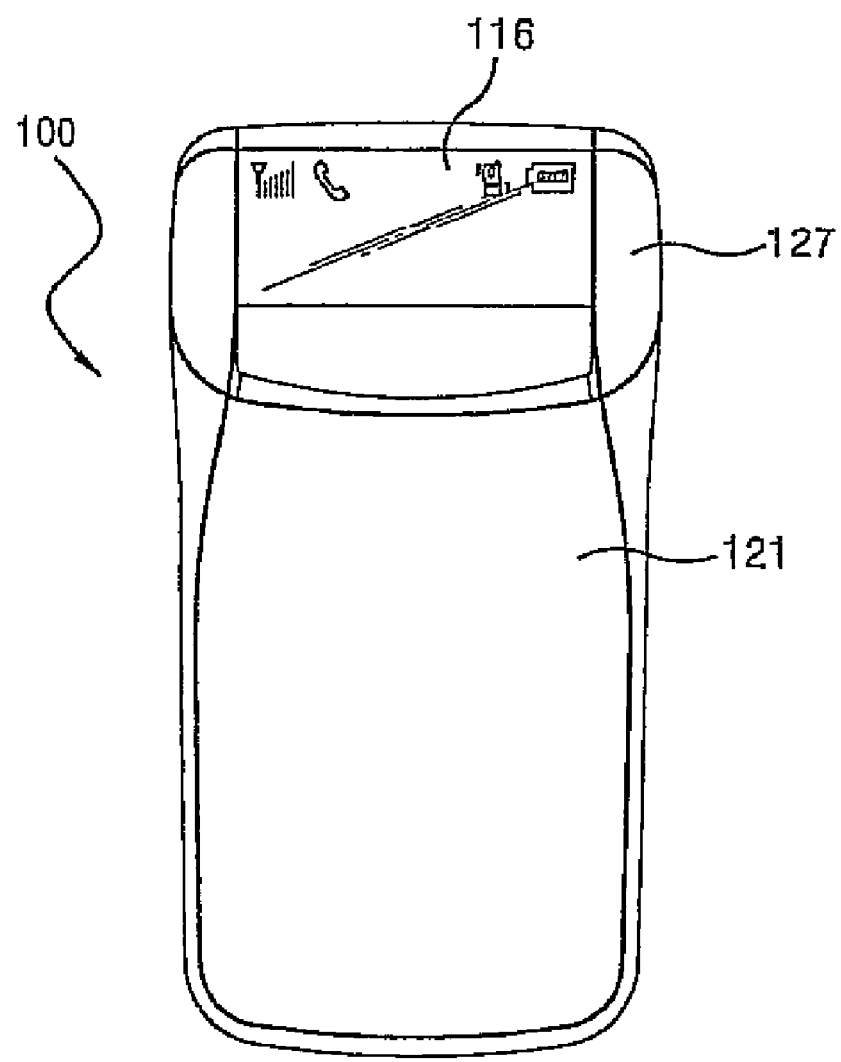
FIG. 5 is a front view illustrating the mobile terminal of FIG. 3 with the folder closed.
Figure 6:
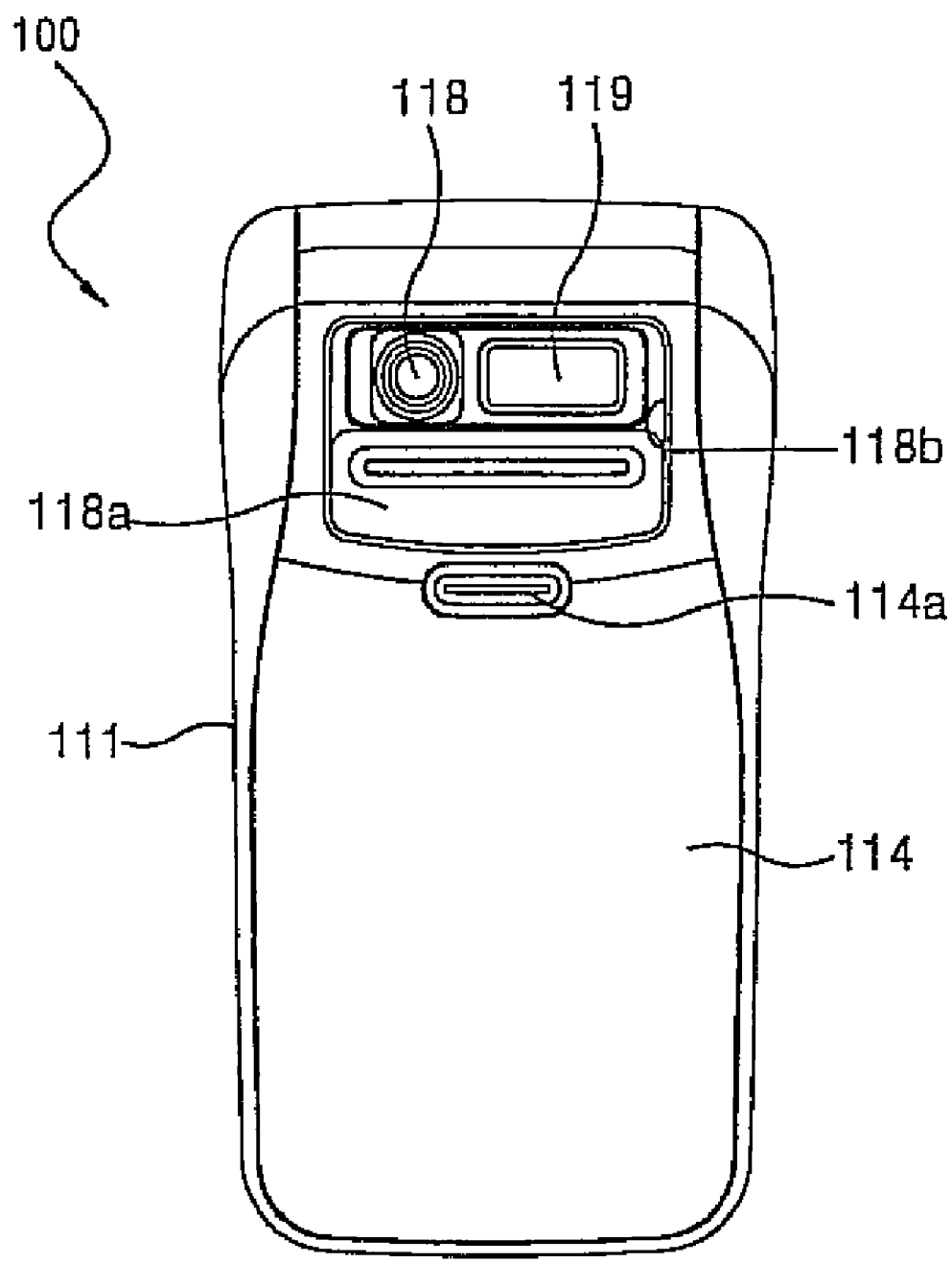
FIG. 6 is a rear view illustrating the mobile terminal of FIG. 3.

The present invention is directed to an apparatus for performing simultaneous voice communication and image communication that allows the user to transmit high quality image information to another user and receive high quality image information from another user. Although the present invention is illustrated with respect to a mobile terminal, it is contemplated that the present invention may be utilized anytime it is desired to facilitate simultaneous voice communication and high quality image communication in a mobile communication device.

Reference will now be made in detail to the preferred embodiments of the present invention, examples of which are illustrated in the accompanying drawings. Wherever possible, the same reference numbers will be used throughout the drawings to refer to the same or like parts.

FIGS. 3 to 8 illustrate a mobile terminal 100 according to one embodiment of the present invention. The mobile terminal 100 includes a main body 110, on which a circuit unit (not shown) is installed and to which a folder 120 is rotatably coupled, and a first display unit 122 located on the folder 120.

The folder 120 includes a folder casing 121 having the first display unit 122 installed thereon, a first camera 124 installed above the first display unit 122, a first flash unit 125 installed below the first display unit 122, a pair of legs 127 that extend from both sides of the lower portion of the folder casing 121 to form a screen exposure portion 126, and hinge shafts 128.

The first camera 124 and first flash unit 125 facilitate photographing a subject positioned in the direction of the user. The screen exposure portion 126 facilitates viewing the screen of the second display unit 116 when the folder 120 covers the main body 110.

The main body 110 further includes a main body casing 111 formed to surround the circuit unit, a keypad 112 located on the front side of the main body casing, a microphone unit 113, a second display unit 116 located on a protruding unit 115 of the main body casing, hinge holes 115a formed at both sides of the protruding unit into which hinge shafts 128 of the folder 120 are rotatably inserted, a battery 114 detachably mounted on the rear side of the main body casing by a lock means 114a, a second camera 118 located inside a recess 118b formed on the rear side of the main body casing, a second flash 119 installed inside the recess adjacent the second camera, and a slide cover 118a slidably installed at the opening of the recess.

The circuit unit (not shown) controls communication functions of the mobile terminal 100. The keypad 112 enables the user to input information. The microphone unit 113 enables the user to input voice. The first display unit 122 and second display unit 116 provide various images and information according to the user's selection. The protruding unit 115 facilitates inclining the screen of the second display unit 116 with respect to the main body 111. The second camera 118 enables the user to photograph a subject positioned in the opposite direction of the user. The slide cover 118a facilitates opening and closing the recess 118b to expose the second camera 118 and second flash 119.

Figure 7:
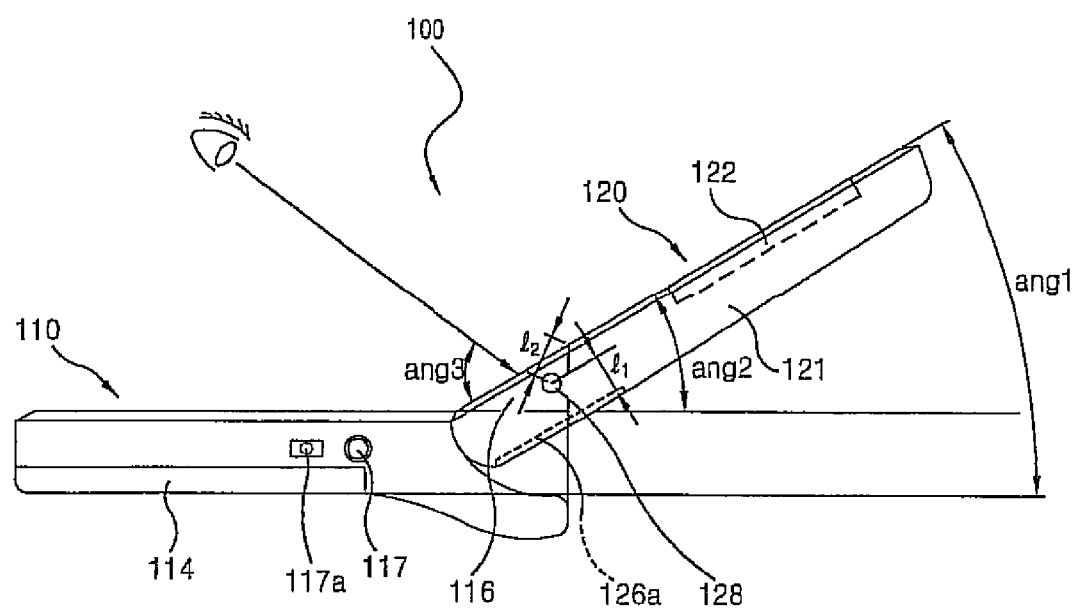
FIG. 7 is a side view illustrating the mobile terminal of FIG. 3 with the folder open.

The hinge shafts 128 of the folder 120 are inserted into the hinge holes 115a of the protruding unit 115 of the main body 110 to connect the folder to the main body. As illustrated in FIG. 7, in order to prevent interference between the protecting window and the inclined protruding unit 115 when the folder 120 is opened or closed, the maximum distance 12 between the center of the hinge shafts 128 and the screen of the second display unit 116 is preferably shorter than the minimum distance 11 between the center of the hinge shafts and the protecting window. FPCB serving as a signal line for transmitting signals from the main body 110 to the folder 120 is coupled to the circuit unit of the main body and the LCD of the folder 120 through the hinge holes 115a of the inclined protruding unit 115 and the hollow portions of the hinge shafts 128.

The screen of the second display unit 116 is exposed through the screen exposure portion 126 when the folder 120 covers the main body 110, thereby enabling the user to view the screen of the second display unit after closing the folder. Preferably, a transparent protecting window 126a is installed on the screen exposure portion 126 to protect the second display unit 116.

As illustrated in FIG. 7, the second display unit 116 is inclined so that the user may view the screen at a convenient field angle. Preferably, the screen of the second display unit 116 is inclined with respect to the main body 110 such that a field angle ang3 between the user and the screen of the second display unit is substantially vertical. With the filed angle substantially vertical, the user may clearly recognize the information displayed on the screen of the second display unit 116.

Preferably, a field angle ang2 between the screen of the second display unit 116 and the main body 110 is substantially identical to a field angle ang1 between the folder 120 and the main body when the folder is completely opened. When the folder 120 is completely opened, the screen of the second display unit 116 and the screen of the first display unit 122 are positioned on the same plane surface, or at least parallel to each other.

The field angle ang1 in the open state of the folder 120 ranges from about 40° to about 55°. Therefore, the field angle ang2 between the screen of the second display unit 116 and the main body 110 preferably ranges from about 40° to about 55°.

It is contemplated that the first camera 124 may be used mainly in image communication to photograph the user and the second camera 118 may be used mostly to photograph a subject near the user. Therefore, the first camera 124 has a charge-coupled device (CCD) with a relatively small number of pixels installed thereon and the second camera 118 has a CCD with a relatively large number of pixels installed thereon.

Preferably, the image captured by the first camera 124 is displayed on the screen of the first display unit 122 and the image captured by the second camera 118 is displayed on the screen of the second display unit 116. However, the image captured by the first camera 124 may be displayed on the screen of the second display unit 116 and the image captured by the second camera 118 may be displayed on the screen of the first display unit 122.

The screen of the first display unit 122 may be divided into a first screen region 122a and a second screen region 122b such that an image captured by the first camera 124 may be displayed on the first screen region and an image captured by the second camera 118 may be displayed on the second screen region 122b. The user may control the shape and size ratio of the first 122a and second 122b screen regions. In use, the first screen region 122a may display the image of the user photographed by the first camera 124 and second screen region 122b may display either the image of another user or another image captured and transmitted by another mobile communication device.

It is contemplated that the image captured by the second camera 118 may be displayed on the screen of the second display unit 116 when the folder 120 covers the main body 110. Since the screen of the second display unit 116 is viewable even when the folder 120 is closed, the user may photograph a subject without opening the folder. Preferably, when the slide cover 118a is moved to expose the recess 118b in which the second camera 118 is located, the image captured by the second camera 118 is automatically displayed on the screen of the second display unit 116.

Figure 8:
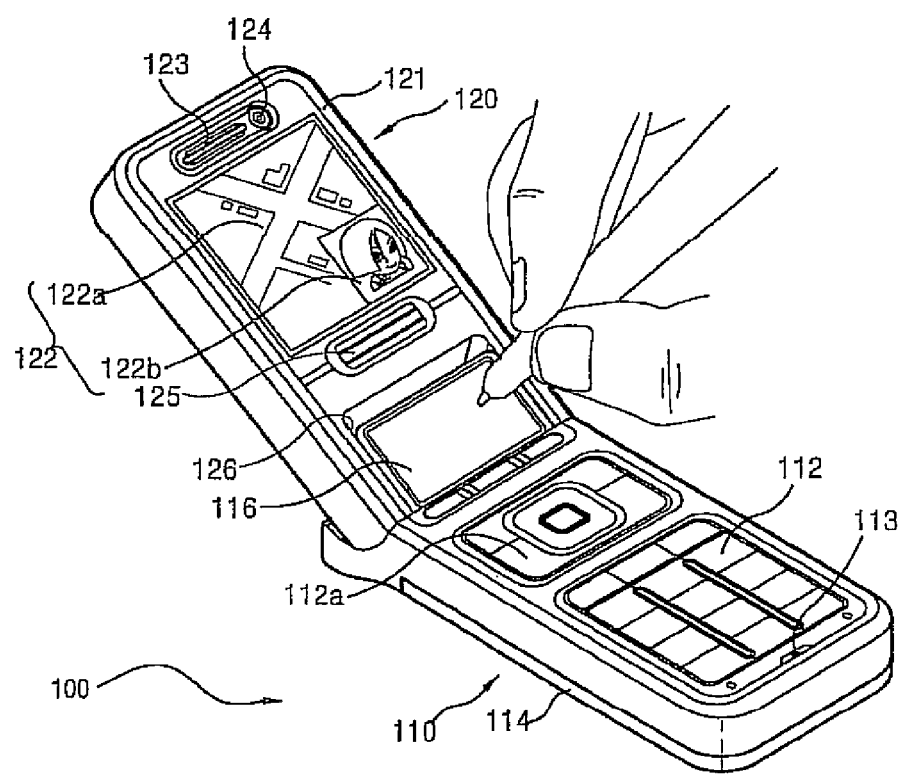
FIG. 8 is a perspective view illustrating the mobile terminal of FIG. 3 having a touch pad on a display.

As illustrated in FIG. 8, a touch pad may be installed on the screen of the second display unit 116. In the call standby state or during general voice communication, the touch pad displays basic information related to the mobile terminal 100 such as battery power, current time vibration mode and alarm information. During image communication, the touch pad allows the user to write or draw characters or pictures on the second display unit 116 with a pen or by hand with the characters or pictures transmitted to another user. It is further contemplated that during image communication the user may change the image communication mode into another mode by touching a pop-up menu displayed on the second display unit 116 with the pen or by hand.

The touch pad functions of the second display unit 116 are not limited to image communication. The touch pad may be provided with a note function to allow the user to make and store notes in a memory of the mobile terminal 100. Preferably, the characters or pictures written or drawn on the second display unit 116 are displayed on the screen of the first display unit 122 and either stored with other images displayed on the first display unit 122 or transmitted to another user.

The position of the first camera 124 and second camera 118 is not limited to the positions illustrated in FIGS. 3-8. It is contemplated that the first camera 124 may be installed on a side of the folder 120 opposite to the side where the first display unit 122 is installed and the second camera 118 may be installed on a front side of the main body 110 such that the second camera may photograph a subject positioned in the direction of the user.

With the first camera 124 and second camera 118 positioned in this way, it is contemplated that the second camera may be used mainly in image communication to photograph the user and the first camera may be used mostly to photograph a subject near the user. Therefore, the second camera 118 has a CCD with a relatively small number of pixels installed thereon and the first camera 124 has a CCD with a relatively large number of pixels installed thereon.

The operation of the mobile terminal 100 in accordance with the embodiment of the invention illustrated in FIGS. 3-8 will now be described in detail.

When the user receives image communication from another user, the user opens the folder 120 and presses a call button 112a to automatically start image communication mode. The first camera 124 captures the image of the user and the image is transmitted to the other user. The user may also view the image of the other user on the screen of the first display unit 122.

If the first display unit 122 is divided into a first screen region 122a and a second region 122b, the image of the other user may be displayed on the first screen region and the image of the user may be displayed on the second screen region. The user may confirm the image being transmitted to the other user.

The user may also directly enter characters by pen or by hand using the touch pad of the second display unit 116 and transmit the characters to the other user during image communication. Additionally, the user may have voice communication with another user while viewing the image of the other user on the screen of the second display unit 116.

FIG. 8 illustrates one example of image communication. The user shares picture data such as a map with the other user on the first screen region 122a of the first display unit 122 while viewing the image of the other user on the second screen region 122b of the first display unit. The user may add information which is inputted by pen or by hand on the touch pad of the second display unit 116 to the picture displayed on the first screen region 122a of the first display unit 122 and transmit the combined information to the other user.

The first screen region 122a and the second screen region 122b of the first display unit 122 are not limited to the image of the user and the other user. The content of the first screen region 122a and second screen region 122b of the first display unit 122 as well as the content of the second display unit 116 may be changed by image mode defaults according to the user.

When the user desires to photograph a subject by using the mobile terminal 100, the slide cover 118a is moved to expose the second camera 118 installed on the rear side of the main body 110 and the photographing button 117 is pressed. When the user desires to photograph a subject after opening the folder 120 on the main body 110, the image of the subject, is displayed on the screen of the first display unit 122. When the user desires to photograph a subject after closing the folder 120 on the main body 110, the image of the subject is displayed on the screen of the second display unit 116 which is viewable when the folder is closed.

When the folder 120 is closed, the second camera 118 installed on the rear side of the main body 110 faces the subject and the user adjusts the image of the subject through the second display unit 116 on the front side of the main body 110. The user may easily adjust the image of the subject that is captured.

Since the mobile terminal 100 is used in a manner similar to a digital camera when the folder 120 is closed, the user feels as if he or she is using a digital camera. Therefore, a user who is not familiar with the camera functions of the mobile terminal 100 may still easily photograph a subject. Furthermore, the user does not have to externally expose the first display unit 122 in order to photograph a subject.

On the other hand, the user may photographs a subject using the first camera 124, for example when it is desired to photograph a subject as well as the user. The user selects the first camera 124 by clicking a module select switch 117a at the side of the main body 110, opens the folder 120, adjusts the image of the subject captured by the first camera and displayed on the first display unit 122 and presses the photographing button 117.

Additionally, the user may use the first flash unit 125 or the second flash unit 119 to photograph a subject when using the first camera 124 or the second camera 118 and may transmit the captured image to another user. Furthermore, since it is difficult for the user to place the receiver 123 to his or her ear while viewing the screens of the first display unit 122 and second display unit 116, it is contemplated that the user may use an in-ear microphone or use the receiver as a speakerphone by increasing the volume. Voice communication using the mobile terminal 100 of the present invention is almost identical to voice communication using a conventional mobile terminal 1 with the exception that the user may make and store simple notes using the touch pad on the second display unit 116 while performing voice communication with the folder 120 in the open state.

Figure 9:
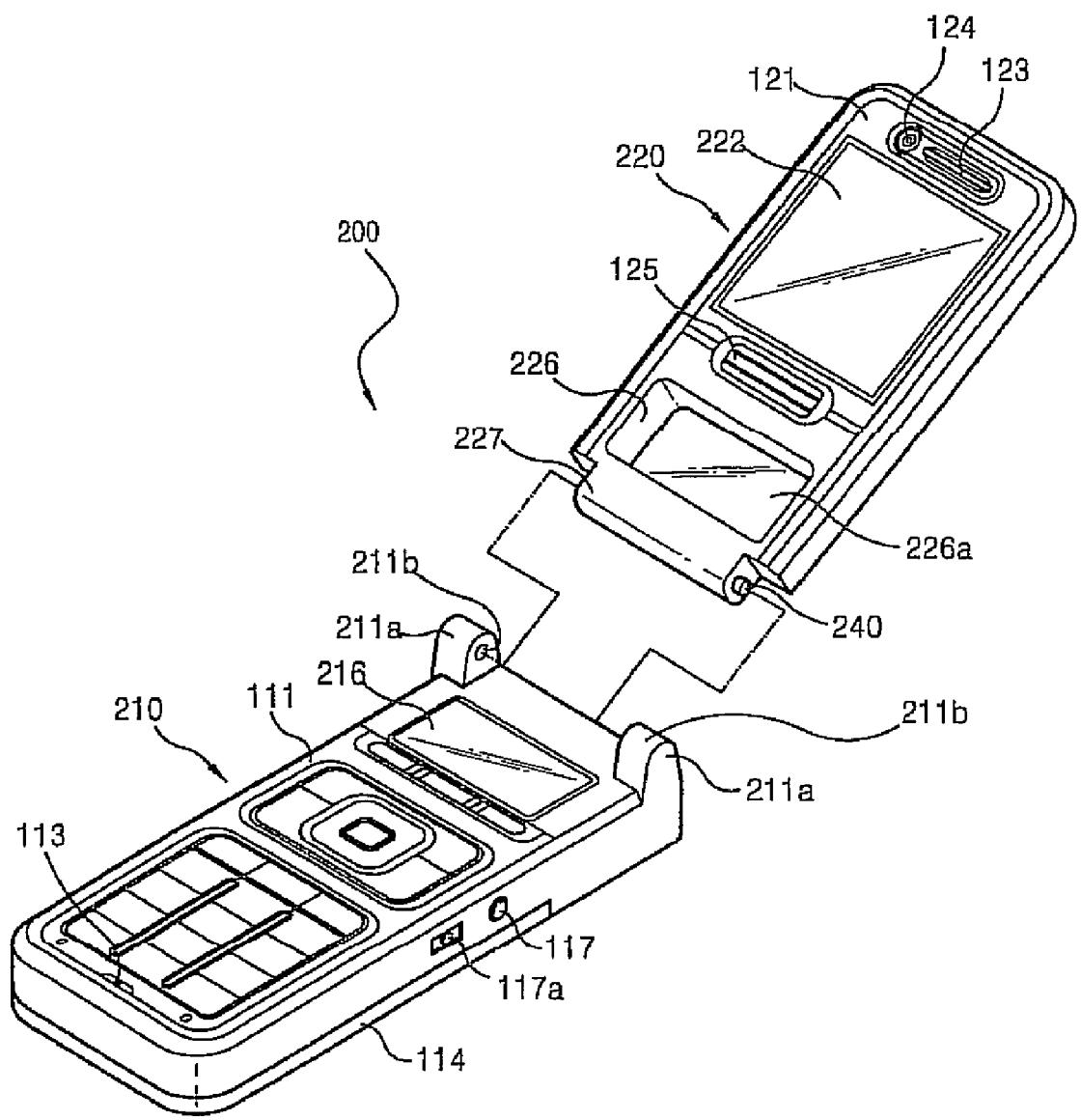
FIG. 9 is a disassembled perspective view illustrating a mobile terminal according to another embodiment of the present invention.

FIG. 9 illustrates a disassembly perspective view of a mobile terminal 200 in accordance with a second embodiment of the present invention. Identical drawing reference numerals are used for the same elements as those of the first embodiment illustrated in FIGS. 3-8 and detailed explanations thereof are omitted. The mobile terminal 200 includes a folder 220 rotatably coupled to a main body 210, a first display unit 222 located on the folder and a second display unit 216 located on the main body The folder 220 is rotatably coupled to the main body 210 by a first fixing unit 227 that protrudes from one side of the folder 220 and a pair of second fixing units 211a that protrude from the main body and are separated by a width as large as the width of the first fixing unit. Hinge shafts 240 are formed at both ends of the first fixing unit 227 and hinge holes 211b into which the hinge shafts are rotatably inserted are formed in the second fixing units 211a.

The second display unit 216 is formed on the same plane surface with the main body 210. A screen exposure portion 226 is formed on the folder 220 such that the screen of the second display unit 216 may be viewed when the folder is closed.

Although the second display unit 216 may be relatively large or located at the middle or lower end of the front side of the main body 210, the mobile terminal 200 obtains the same effects as those of the first embodiment of the present invention. Preferably, a transparent protecting window 226a for protecting the screen of the second display unit 216 is installed outside the screen exposure portion 226 of the folder 220.

In a third embodiment of the present invention, the second display unit 216 formed on the same plane surface with the front side of the main body 210 may be inclined to obtain a field angle with respect to the user. The screen exposure portion 226 is sufficiently large not to interfere with a protruding second display unit 216.

The operation of the mobile terminal 200 in accordance with the second and third embodiments of the present invention is substantially identical to the operation of the mobile terminal 100 in accordance with the first embodiment of the present invention. As with the first embodiment of the invention, when the folder 220 is open, the user may view both the first display unit 226 and the second display unit 216. Additionally, the user may write or draw characters or pictures by using a pen or by hand using a touch pad installed on the second display unit 216 and the characters or pictures may be stored or transmitted to another user. Furthermore, if the CCD mounted on the first camera 124 has a smaller number of pixels than the CCD mounted on the second camera 118, the first camera having the small number of pixels is used mainly to photograph the user during image communication and the second camera having the large number of pixels is used mainly to photograph a subject near the user.

The mobile terminal 200 provides efficient image communication functions and digital camera functions. Furthermore, if the screen of the display unit 216 is inclined with respect to the main body 210, the user may easily view the screen of the second display unit and use the touch pad installed on the second display unit. Moreover, the user may adjust the image of a subject using the second display unit 216 and photograph the subject using the second camera 118 without opening the folder 220.

As the present invention may be embodied in several forms without departing from the spirit or essential characteristics thereof, it should be understood that the above-described embodiments are not limited by any of the details of the foregoing description, unless otherwise specified. The present invention should be construed broadly within the spirit and scope of in the appended claims and, therefore, all changes and modifications that fall within the metes and bounds of the claims, or equivalence of such metes and bounds are intended to be embraced by the claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal configured to perform video telephony, the mobile terminal comprising:
   a housing;
   a first camera located on a front surface of the housing;
   a second camera located on a rear surface of the housing;
   at least one input unit adapted to allow a user to select at least the first camera or the second camera to perform an image capturing function;
   a first display unit having a viewing direction that is essentially the same as a capturing direction of the first camera, the first display unit adapted to function as a viewfinder by showing an image captured by at least the first camera or second camera; and
   a transceiver adapted to transmit the captured image to another mobile terminal and to receive an image captured by the another mobile terminal for the video telephony,
   wherein the capturing direction of the first camera is different than a capturing direction of the second camera,
   wherein the first display unit comprises at least a first screen region and a second screen region,
   wherein the first screen region is adapted to display either an image captured by the first camera or picture data and the second screen region is adapted to display the image received from the another mobile terminal in an image communication mode,
   wherein the image or picture data displayed on the first screen region is transmitted to the another mobile terminal, and
   wherein a determination between displaying the image captured by the first camera and the picture data on the first screen region is based on a user selection.

2. The mobile terminal of claim 1, wherein the housing comprises a first body and a second body, the first body moveable with respect to the second body such that the mobile terminal has an open configuration and a closed configuration.

3. The mobile terminal of claim 2, further comprising a protective device adapted to cover the second camera, the protective device moveable between an open position and a closed position.

4. The mobile terminal of claim 2, wherein the first camera and the first display unit are located on the first body and the second camera is located on the second body.

5. The mobile terminal of claim 2, further comprising a second display unit adapted to function as a viewfinder by showing an image captured by the second camera while the mobile terminal is in the closed configuration.

6. The mobile terminal of claim 2, wherein the first camera is located on either the same side of the first body as the first display unit or on the opposite side of the first body as the first display unit.

7. The mobile terminal of claim 3, wherein an image captured by the second camera is automatically displayed on a second display unit when the protective device is moved to the open position to expose the second camera.

8. The mobile terminal of claim 1, wherein an image resolution of the first camera is lower than an image resolution of the second camera.

9. A mobile communications device comprising:
   a first body;
   a second body moveable with respect to the first body such that the mobile communications device has an open configuration and a closed configuration;
   a first image capturing device located on the first body and having a first capturing direction;
   a second image capturing device located on the second body and having a second capturing direction;
   at least one switch key adapted to initiate an image capturing function;
   a transceiver adapted to transmit an image captured by at least the first image capturing device or the second image capturing device to another mobile communications device and to receive an image captured by the another mobile communications device; and
   a first display unit having a viewing direction that is essentially the same as the first capturing direction,
   wherein the first display unit comprises at least a first screen region and a second screen region,
   wherein the first screen region is adapted to display either an image captured by the first image capturing device or picture data and the second screen region is adapted to display the image received from the another mobile terminal in an image communication mode,
   wherein the image or picture data displayed on the first screen region is transmitted to the another mobile terminal, and
   wherein a determination between displaying the image captured by the first image capturing device and the picture data on the first screen region is based on a user selection.

10. The mobile communications device of claim 9, wherein the first capturing direction is different from the second capturing direction.

11. The mobile communications device of claim 10, wherein the first display unit is adapted to provide a viewfinder function by displaying the image captured by the at least first image capturing device or second image capturing device.

12. The mobile communications device of claim 9, wherein the at least one switch key is further adapted to allow a user to select the at least first image capturing device or second image capturing device to perform the image capturing function.

13. The mobile communications device of claim 12, wherein the first image capturing device and the first display unit are located on the first body and the second image capturing device is located on the second body.

14. The mobile communications device of claim 13, further comprising a second display unit adapted to provide a viewfinder function by displaying an image captured by the second image capturing device when the mobile communications device is in the closed configuration.

15. The mobile communications device of claim 14, wherein the first image capturing device is located either on the same side of the first body as the first display unit or on the opposite side of the first body as the first display unit and the second image capturing device is located either on the same side of the second body as the second display unit or on the opposite side of the second body as the second display unit.

16. The mobile communications device of claim 14, wherein the image captured by the second image capturing device is automatically displayed on the second display unit when a protective cover is moved to an open position.

17. A mobile terminal comprising:
   a body;
   a first display screen located on a front surface of the body;
   a second camera located on a rear surface of the body and having a first capturing direction, the second capturing direction different than the first capturing direction and essentially coincident with a viewing direction of the first display screen; and
   a transceiver adapted to transmit an image captured by the second camera to another mobile terminal in order to perform a video telephony function, wherein an image captured by the second camera is displayed on the first display screen and transmitted to the another mobile terminal when an image communication mode starts to perform the video telephony function,
   wherein the first display screen is configured to function as a viewfinder by showing an image captured by at least the first camera or second camera, and wherein the characters received via the second display screen are transmitted to the another mobile terminal in the image communication mode.

18. The mobile terminal of claim 17, wherein the first capturing direction is essentially opposite to the viewing direction of the first display screen.

19. The mobile terminal of claim 17, wherein the second capturing direction is toward a user and the first capturing direction is away from the user.

20. The mobile terminal of claim 17, wherein the first camera is fixed with respect to the body and the second camera is movable with respect to the body.

21. The mobile terminal of claim 17, further comprising a folder operatively attached to the body and adapted to be opened and closed and wherein the second camera is attached to the folder.

22. The mobile terminal of claim 21, wherein the folder is adapted to provide protection for the second camera when the folder is closed.

23. The mobile terminal of claim 21, wherein:
   the second display screen is located on the folder and adapted to be viewable when the folder is opened; and
   the first capturing direction is essentially opposite to a viewing direction of the second display screen.

24. The mobile terminal of claim 17, further comprising a protective cover operatively attached to the rear surface of the body and adapted to cover or expose the first camera.

25. The mobile terminal of claim 1, wherein the first screen region is sized to include the entire second screen region at a portion of the first screen region.

* * * * *